Nov. 6, 1934.　　　　G. H. LELAND　　　　1,979,478
BORING MACHINE
Filed July 11, 1932　　　3 Sheets-Sheet 1
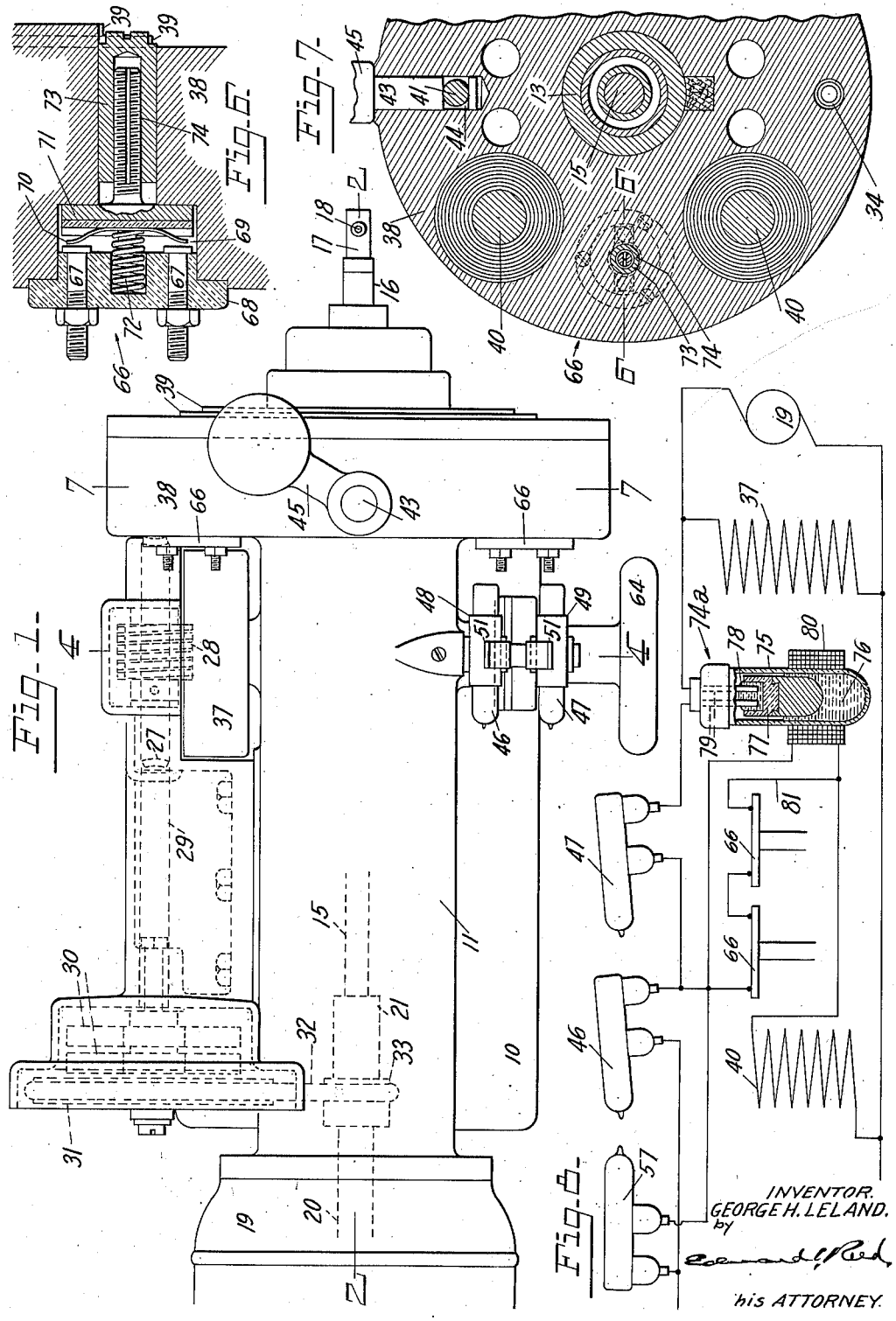

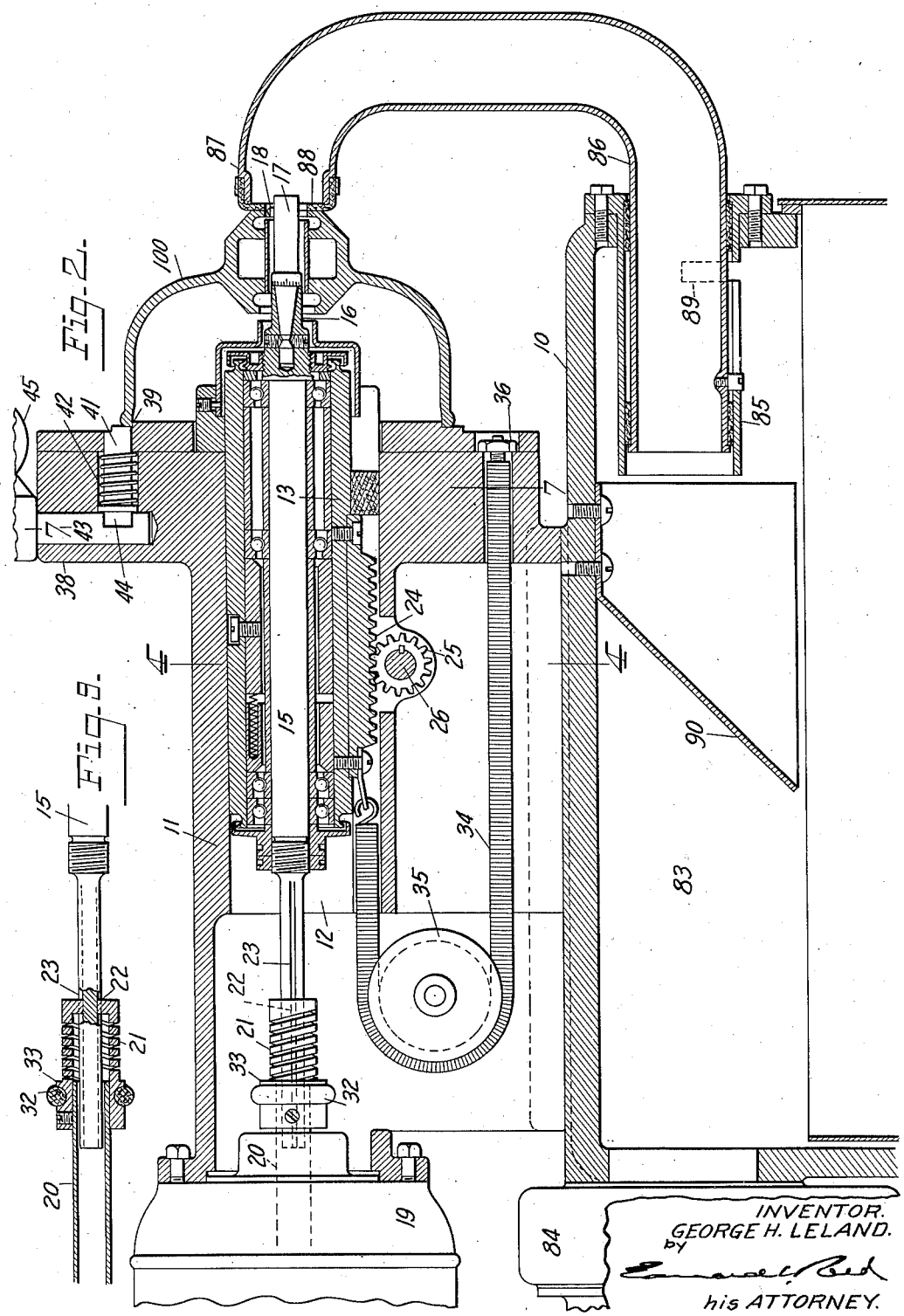

Nov. 6, 1934.                G. H. LELAND                1,979,478
                              BORING MACHINE
                         Filed July 11, 1932    3 Sheets-Sheet 3
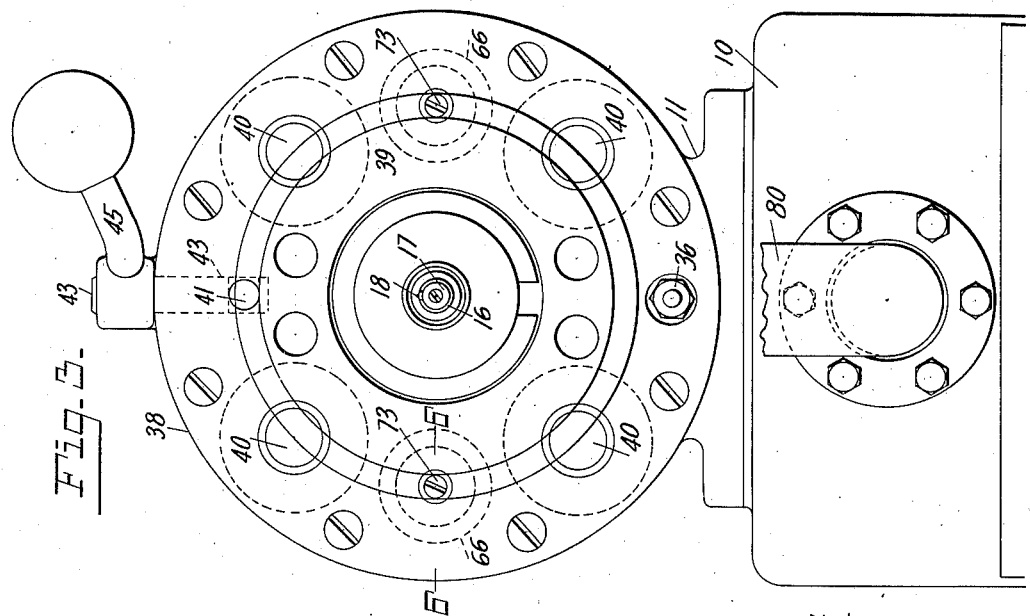
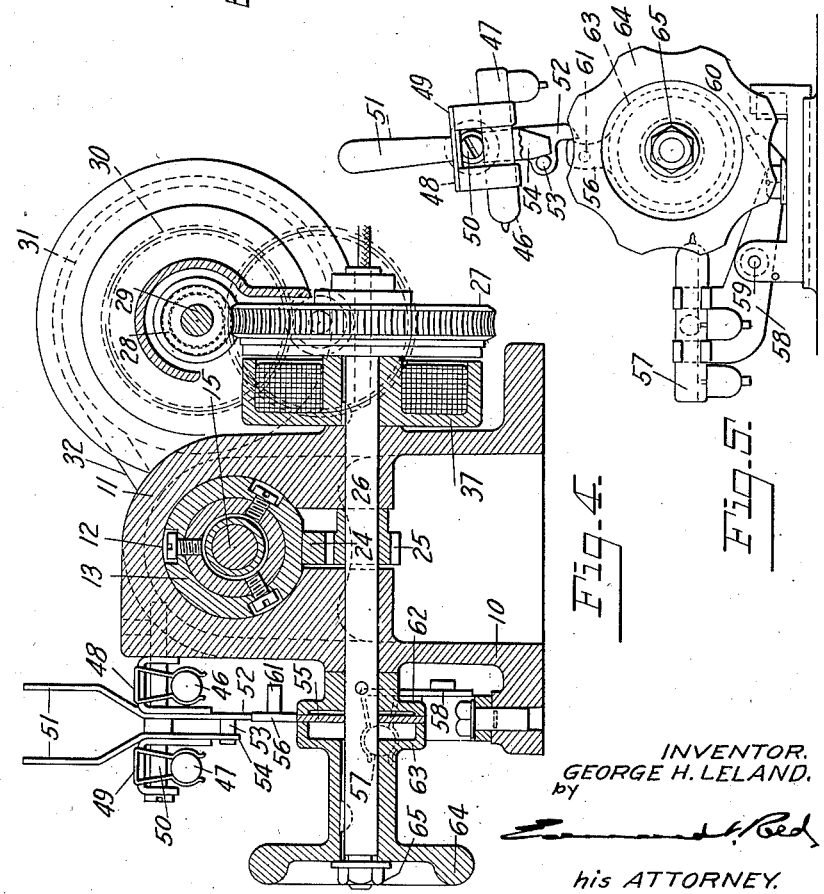
INVENTOR.
GEORGE H. LELAND.
by
his ATTORNEY.

Patented Nov. 6, 1934

1,979,478

UNITED STATES PATENT OFFICE 1,979,478

BORING MACHINE

George H. Leland, Dayton, Ohio, assignor of one-half to The Leland Electric Company, Dayton, Ohio, a corporation of Ohio Application July 11, 1932, Serial No. 621,941

49 Claims. (Cl. 77—3)

This invention relates to a boring machine and was designed primarily for boring out or enlarging the shaft opening in the end frame or head for an electric motor, the opening being formed in the head when the latter is cast.

One object of the invention is to provide a boring machine which will require a minimum amount of attention by the operator and to this end it is a further object of the invention to provide a machine which, after being set in operation, will be wholly automatic and will complete the boring operation and release the work without further attention on the part of the operator, thus enabling him to place the motor head, or other work, in position, start the machine and then prepare a second piece of work for operation while the first piece is being bored.

A further object of the invention is to provide simple and efficient means for automatically controlling the several operations and for causing the operations to take place in the proper sequence.

A further object of the invention is to provide such a machine with means to prevent the starting of the boring operation until the work is accurately positioned on the work support.

A further object of the invention is to provide such a machine with means for preventing the removal of the work from the work support until the cutter has been retracted.

A further object of the invention is to provide such a machine with means for ejecting or displacing the work with relation to the work support.

A further object of the invention is to provide such a machine with a chip remover which can be quickly and easily moved into and out of its operative position.

A further object of the invention is to provide such a machine with means for circulating air about the cutter to cool the same.

Other objects of the invention will appear as the mechanism is described in detail.

In the accompanying drawings Fig. 1 is a top plan view of a machine embodying my invention; Fig. 2 is a vertical sectional view taken on the line 2—2 of Fig. 1; Fig. 3 is a front elevation of the machine with the chip remover partly broken away; Fig. 4 is a section taken on the line 4—4 of Fig. 2; Fig. 5 is a detail of the switch actuating device; Fig. 6 is a sectional detail view of the work controlled switch on the work support; Fig. 7 is a sectional view through a portion of the work support, taken on the line 7—7 of Fig. 1; and Fig. 8 is a circuit diagram.

In these drawings I have illustrated one embodiment of my invention but it will be understood that this particular embodiment was chosen for the purpose of illustration only and that the mechanism may take various forms or may be utilized for boring articles of various kinds.

In the embodiment here shown the machine comprises a base 10 on which is supported a housing 11, the base and the housing constituting a frame on which the several parts of the mechanism are mounted. The housing is provided with a longitudinal guideway 12 in which is supported a reciprocatory boring member or carriage 13. A shaft 15 is journaled in the carriage 13 and held against axial movement with relation thereto. At its forward end the shaft is provided with a chuck 16 in which is mounted a cutter 17, the cutter being here shown as a diamond cutting tool, the diamond being indicated at 18.

The shaft 15 may be rotated and axial movement imparted to the carriage 13 by power mechanism of any suitable character. Preferably the shaft 13 is rotated by means of an electric motor 19 which, in the present instance, is mounted on a fixed part of the housing 11 and has its shaft 20 arranged in substantial alinement with and operatively connected to the cutter shaft 15. It is preferable that the connection between the two shafts should be a flexible one to compensate for any slight misalinement of the two shafts. In the present construction the coupling member is shown at 21 and comprises a spiral structure having one end rigidly secured to the motor shaft 20 and having its other end provided with an opening to receive the reduced end portion of the cutter shaft 15. A coupling is provided adjacent to this opening with inwardly extending projections or keys 22 which enter keyways 23 in the shaft 15 and hold the two shafts against relative rotation. The reduced end portion of the shaft 15 extends through the coupling member and into the hollow motor shaft so that the cutter shaft 15 can have reciprocatory movement with relation to the motor.

The forward or feeding movement is preferably imparted to the carriage 13 from the same source of power that rotates the shaft 15 and, in the present construction, the carriage has secured thereto a longitudinal toothed rack 24 which meshes with a pinion 25 secured to a transverse shaft 26 journaled in the housing. One end of this shaft projects beyond the side of the housing and carries a worm wheel 27 which meshes with a worm 28 on a shaft 29, extending lengthwise of the housing and connected by reducing gearing 30 with a belt pulley 31 which is rotatably supported on the shaft 29. This belt pulley is connected by a belt 32 with a belt pulley 33 on the motor shaft. As here shown, the pulley 33 is formed on the coupling device 21. Thus the motor serves both to rotate the cutter and to impart feeding movement thereto. At the end of each feeding movement the cutter and its carriage are retracted, to withdraw the cutter from the work, and this may be accomplished in various ways. In the present machine a coiled spring 34 is connected with the rear end of the carriage, extends about a guide pulley 35 and is connected with the frame near the forward end of the housing, as shown at 36. It is desirable that the carriage should be retracted without rotating the motor or connecting mechanism in a reverse direction and I have therefore mounted the worm wheel 27 loosely on the shaft 26 and have provided a magnetic clutch 37 for connecting the worm wheel with the shaft.

The means for supporting the work in proper relation to the cutter may take various forms and its character will depend in part at least upon the nature of the article which is to be bored. In the machine here illustrated the housing 11 is provided at its forward end with a circular enlargement 38, the front face of which constitutes the work support and is provided with a circular shoulder 39 to receive the circular end portion of the motor head 100 and accurately center the same with relation to the cutter. If desired, a plurality of such shoulders may be provided to accommodate the work support to heads of different diameters. Any suitable means may be utilized for retaining the work on the work support but I prefer to employ magnetic chucks for this purpose. In the present instance, there are four of these chucks and they are mounted within the enlargement 38 of the housing and each comprises an armature or core 40 extending through the face of the work support and having its outer end substantially flush therewith. When the work has been properly positioned on the work support and the magnetic chucks energized the work will be firmly held in place so long as the energization is maintained. Due to residual magnetism in the chucks the work may adhere to the work support after the chucks have been deenergized and to facilitate the removal of the work I have provided an ejecting device which comprises a plunger 41 slidably mounted in the work support and adapted to be projected beyond the face thereof. A spring 42 holds the plunger normally in its retracted position and a stud shaft 43 extending transversely to the plunger has a cam slot 44 which receives the inner end of the plunger and, when the stud shaft is rotated, actuates the plunger to project the outer end thereof beyond the face of the work support. The stud shaft 43 projects beyond the circumferential wall of the work support and has secured thereto a handle 43 by means of which it may be conveniently actuated. It will be noted that in the present arrangement the ejector stud is so arranged that it will engage work mounted on either of the circular shoulders 39.

The circuits for the several electrically operated devices are illustrated in Fig. 8 and it will be there noted that the circuit for the magnetic chucks 40 is controlled by a switch 46 and that the circuit for the motor 19 and magnetic clutch 37 is controlled by a separate switch 47. As shown in Figs. 4 and 5, these switches are mercury tube switches and are mounted in brackets 48 and 49 pivotally mounted on a stud 50 which projects from the housing 11. Each bracket has secured thereto an upwardly projecting handle 51 by means of which it may be operated. The bracket 48 which carries the chuck switch has a depending finger 52 from which extends a pin 53 which lies in the path of a finger 54 depending from the bracket 49 of the motor and clutch switch. In operation the operator first places his work in proper position upon the work support, then closes the chuck switch to secure the work in position and then closes his motor and clutch switch. Should he inadvertently operate the motor switch before he operates the chuck switch the finger 54 of the bracket for the motor switch will engage the pin which is connected with the bracket for the chuck switch and cause that switch to be closed simultaneously with the closing of the motor and clutch switch, thereby preventing the motor from being started before the chucks are energized.

Both the rotary movement and the axial movement of the cutter are automatically controlled and this is preferably accomplished by opening the motor and clutch switch when a predetermined movement has been imparted to the carrier. For this purpose I have provided a switch actuating device which is controlled in accordance with the movement of the carriage. As here shown, this device comprises a disk 55 secured to the transverse shaft 26 and having a projection 56 which constitutes a trip arm which is so positioned with relation to the shaft 26 and pinion 25 that it will engage the finger 52 on the supporting bracket for the chuck switch and move that switch to its open position, the pin 53 engaging the finger 54 of the motor and clutch switch and causing that switch to be opened simultaneously with the chuck switch. Should the cutter or carriage stick or for any reason fail to return to its initial position when the switches are opened the cutter will remain in the work and the operator not being aware of this fact may attempt to remove the work in the usual manner and in doing so injure the cutter, a diamond cutting tool being especially liable to such injury. To avoid the possibility of such injury means are provided for preventing the removal of the work until the carriage had been retracted. When, as in the present instance, magnetic chucks are employed this is preferably accomplished by means of a second switch in the chuck circuit which will maintain that circuit closed after the switch 46 has been opened. This switch, which may be termed a safety switch, is shown at 57 in Figs. 5 and 8, and is connected in the chuck circuit in parallel with the switch 46. It is here shown as supported on one end of a lever 58 which is pivotally mounted between its ends, at 59, and is of such a construction that when the lever is unrestrained the switch will move by gravity to its closed position. That end of the lever opposite the switch extends beneath the shaft 26 and has an inclined portion 60 arranged to be engaged by a pin 61 on the trip arm 56 when the carriage and shaft have been returned to their initial positions, and thus move the safety switch 57 to its open position, thereby deenergizing the magnet chucks and releasing the work. The safety device will be held in its open position until forward movement is again imparted to the carriage. The initial forward movement of the carriage will move the pin 61 out of engagement with the lever 58 and permit the safety switch to return to its closed position. The trip arm 56 may be adjusted to vary the amount of movement which will be imparted to the carriage before the operation of the same is interrupted, and, as here shown, the disk 55 is clamped between a member 62 rigidly secured to the shaft 26 and a member 63 slidably but non-rotatably mounted on the outer end portion of that shaft and connected with a hand wheel 64. A nut 65 threaded onto the end of the shaft 26 serves to move the member 63 toward the member 62 and firmly clamp the disk between the two members in any position to which it has been adjusted. The hand wheel 64 enables the carriage and connected parts to be adjusted by hand in setting up the machine or when such operation is desirable for any reason.

It is important that the work should be properly positioned on the work support before the cutter is operated, otherwise the work itself may be ruined and the cutter damaged. Various work controlled devices may be utilized for preventing the operation of the cutter until the work is properly positioned but I prefer to utilize a work controlled switch which controls the closing of the motor and clutch circuit. In the present construction I have mounted in the enlarged portion 38 of the housing, which constitutes the work support, two switches which are identical in construction and which are arranged on opposite sides of the center of the work support and which are indicated as a whole by the reference numeral 66. Each of these switches comprises two fixed contact members 67 mounted in a plug of insulating material 68 which closes the end of a recess 69 into which the contacts 67 extend. Mounted in this recess is a contact member 70, adapted to connect the contact members 67, and the contact member 70 is carried by a supporting member or head 71 slidably mounted in the recess and held normally in its retracted position by a spring 72, in which position the switch is open. Connected with the head 71 is a plunger 73 which extends a short distance beyond the face of the work support. In the present instance, the plunger is screw threaded onto a stud 74 secured to the head 71 so that the distance which the plunger extends beyond the work support may be regulated. The arrangement of the switches is such that they can both be engaged and operated by the work only when the work is accurately positioned upon the work support and inasmuch as the two switches are connected in series in the controlling circuit that circuit cannot be closed until both switches are operated. The work controlled switches 66 may be connected with the motor and clutch circuit in any suitable manner but, in the present instance, I have connected them in a supplemental controlling circuit. As shown in Fig. 8 a relay 74a is interposed in the clutch and motor circuit between the switch 47 and the motor and clutch. This relay may take various forms but is illustrated as comprising a tubular receptacle 75 containing a quantity of liquid 76 on which is supported a contact member 77 which comprises a cup containing mercury 78. The two sides of the motor circuit are connected with electrodes 79 so arranged that when the contact member 77 is in its uppermost position the electrodes will be immersed in the mercury but when the contact member 77 is in its lower portion the electrodes will be out of engagement with the mercury, thus breaking the circuit. The contact member 77 is of magnetic metal and is controlled by a magnet 80 arranged about the lower portion of the receptacle 77 and connected in the chuck circuit, so that the magnet will be energized whenever the chuck switch 46 is closed. When the magnet is so energized the contact member 77 will be drawn downward and the motor and clutch circuit broken, thereby preventing the closing of the circuit through the clutch and motor even though the switch 47 is closed. The two work operated switches 66 are connected in a shunt circuit 81 which is connected with the chuck circuit across the terminals of the magnet 80 and when both of the work operated switches are closed the magnet 80 will be short circuited and the contact member 77 permitted to rise to its normal or closed position, thereby completing the circuit through the clutch and the motor.

It will be apparent therefore that in operating the machine the operator first places the work in proper position upon the work support, thus bringing the same in contact with the magnetic chucks and closing the switches 66. He then operates, either simultaneously or in succession, the chuck switch 46 and the motor and clutch switch 47, thereby starting the motor into operation and establishing the driving connection between the same and the reciprocatory carriage. The carriage then moves forwardly, feeding the cutter through the work, until the trip arm 56 on the actuating shaft 26 opens the switches 46 and 47, thus stopping the motor and disconnecting the carriage actuating device, 24 and 25, from the motor and permitting the carriage to be retracted by its spring. The motor having been stopped prior to the retraction of the carriage the cutter is not in rotation during its return movement. The chuck switch 46 having been opened the magnetic chucks are energized only through the safety switch 57 and when the carriage has completed its rearward movement this switch is opened and the chucks are deenergized, thus releasing the work. The operator then actuates the ejecting plunger 41 to displace the work with relation to the work support and removes the same.

It is also desirable that the chips or cuttings removed by the cutter be withdrawn and that means be provided to prevent the overheating of the cutter. Both results may be achieved by circulating a current of air about the cutter during the cutting operation, and for this purpose I have provided a suction operated device of such a character that it can be quickly and easily moved into operative relation to the work after the latter has been placed on the work support and moved out of engagement therewith when it is desired to remove the work. As here shown, a suction chamber 83 is formed in the base 10 of the machine and is connected at its rear end with a suction fan contained within a casing 84 and operated by a suitable motor. Preferably this motor is separate from the motor 19 and is not here shown. At its forward end the suction chamber is provided with an elongated bearing 85 in which is rotatably and slidably mounted one end of a conduit 86. This conduit is here shown as having its intake end 87 substantially parallel with but offset from that part of the conduit which is mounted in the bearing 85 and by sliding the conduit outwardly and then moving the same about its axis to aline the intake end of the same with the opening in the work support it may be again pressed inwardly and brought into a position closely adjacent to that opening. Preferably it is provided with a flange 88 of flexible material, such as felt, to provide a snug connection between the work and the end of the conduit. The conduit is guided in its movement and retained in its adjusted position by a bayonet slot connection between the bearing and the conduit, as shown at 89. When the conduit is properly connected with the work air will be drawn through the opening in the work and this air will cool the cutter and withdraw the chips from the opening into the chamber 83 where they will impinge against an inclined baffle 90 and be deflected to the bottom of the chamber while the air passes through the outlet to the suction fan. It will be apparent that by merely grasping the transverse portion of the conduit 86 the latter may be quickly moved into and out of its operative position.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. In a boring machine, a reciprocatory carriage, a cutter carried by said carriage, a shaft journaled on said carriage and connected with said cutter, an electric motor having a driving connection with said shaft, actuating mechanism for said carriage connected with said motor and including a magnetic clutch, a work support comprising a magnetic chuck, a work controlled switch mounted adjacent to said work support to prevent the operation of said motor and said magnetic clutch until the work is properly positioned on said work support, means controlled in accordance with the movement of said carriage to interrupt the operation of said motor and to deenergize said clutch and said chuck, and means to retract said carriage.

2. In a boring machine, a reciprocatory carriage, a cutter carried by said carriage, a shaft journaled on said carriage and connected with said cutter, an electric motor having a driving connection with said shaft, actuating mechanism for said carriage connected with said motor and including a clutch, a work support comprising a magnetic chuck, means controlled in accordance with the movement of said carriage to interrupt the operation of said motor, to release said clutch and to deenergize said chuck, means for retracting said carriage, and a work ejecting device carried by said work support.

3. In a boring machine, a reciprocatory carriage, a cutter carried by said carriage, a shaft journaled on said carriage and connected with said cutter, a motor having driving connection with said shaft, actuating mechanism for said carriage connected with said motor and including a clutch, a work support comprising a magnetic chuck, means controlled in accordance with the movement of said carriage to interrupt the operation of said motor, to release said clutch and to deenergize said chuck, a plunger slidably mounted in said work support to engage the work thereon, and manually operated means for actuating said plunger to release the work from said work support.

4. In a boring machine, a reciprocatory carriage, a cutter carried by said carriage, a shaft journaled on said carriage and connected with said cutter, an electric motor having a driving connection with said shaft, actuating mechanism for said carriage connected with said motor and including a magnetic clutch, a work support comprising a magnetic chuck, switches connected in circuit with said chuck and with said motor and said clutch, actuating devices to separately close said switches, means actuated in accordance with the movement of said carriage to automatically open said switches when said carriage has been advanced a predetermined distance, and means to retract said carriage.

5. In a boring machine, a reciprocatory carriage, a cutter carried by said carriage, a shaft journaled in said carriage and connected with said cutter, an electric motor having a driving connection with said shaft, actuating mechanism for said carriage connected with said motor and including a magnet clutch, a work support comprising a magnetic chuck, switches connected in circuit with said chuck and with said motor and said clutch, actuating devices to separately close said switches a relay connected in circuit with said motor and with said magnetic clutch, and comprising a magnet connected in circuit with said chuck and adapted to actuate said relay to open the circuit for said motor and said clutch when said chuck circuit is closed, a shunt circuit connected with said chuck circuit across said magnet, a normally open work controlled switch connected in said shunt circuit and arranged to be closed when the work is properly positioned on said work support and to thereby deenergize said magnet and cause said relay to close the circuit through said motor and said clutch, and means controlled in accordance with the movement of said carriage to automatically open the switches in said chuck circuit and said motor and clutch circuit when said carriage has been advanced a predetermined distance.

6. In a boring machine, a reciprocatory carriage, a cutter carried by said carriage, a shaft journaled on said carriage and connected with said cutter, a work support having operable means to retain the work thereon, power operated means to rotate said shaft, a device to actuate said carriage, means to connect said carriage actuating device with said power operated means, means controlled in accordance with the movement of said carriage to disconnect said carriage actuating device from said power operated means when said carriage has been advanced a predetermined distance, means to retract said carriage, and means to cause said work support to release the work thereon when said carriage has been retracted.

7. In a boring machine, a reciprocatory carriage, a cutter carried by said carriage, a shaft journaled on said carriage and connected with said cutter, an electric motor having driving connection with said shaft, actuating mechanism for said carriage connected with said motor and including an electrically controlled clutch, a switch in circuit with said motor and said clutch, a work support comprising a magnetic chuck, a switch in circuit with said chuck, means controlled in accordance with the movement of said carriage to open said switches when said carriage has been advanced a predetermined distance, means to retract said carriage, and means to prevent the release of the work on said work support until said carriage has been retracted.

8. In a boring machine, a reciprocatory carriage, a cutter carried by said carriage, a shaft journaled on said carriage and connected with said cutter, an electric motor having driving connection with said shaft, actuating mechanism for said carriage connected with said motor and including an electrically controlled clutch, a switch in circuit with said motor and said clutch, a work support comprising a magnetic chuck, a switch in circuit with said chuck, manually controlled means to close said switches, a second switch connected in circuit with said chuck in parallel with the first mentioned switches, means controlled in accordance with the movements of said carriage to open said first mentioned switches when said carriage has been advanced a predetermined distance and to open the last mentioned switch when said carriage has been retracted, and means to retract said carriage when the first mentioned switches have been opened.

9. In a boring machine, a reciprocatory carriage, a cutter carried by said carriage, a shaft journaled on said carriage and connected with said cutter, an electric motor having driving connection with said shaft, actuating mechanism for said carriage connected with said motor and including an electrically controlled clutch, a switch in circuit with said motor and said clutch, a work support comprising a magnetic chuck, a switch in circuit with said chuck, manually controlled means to close said switches, a second switch connected in circuit with said chuck in parallel with the first mentioned switches, means controlled in accordance with the movement of said carriage to cause the last mentioned switch to be closed when forward movement is imparted to said carriage, to cause said first mentioned switches to be opened when said carriage has been advanced a predetermined distance and to cause said last mentioned switch to be opened when said carriage returns to its initial position, and means to retract said carriage when said first mentioned switches are opened.

10. In a boring machine comprising a cutter, a motor, means driven by said motor to actuate said cutter, and means for supporting an article having an opening which is to be enlarged with said opening in line with said cutter, a chip remover comprising a conduit having its intake end movable into and out of a position adjacent to and in line with the opening in said article and into sealing engagement with said article about the opening therein, and means for causing the chips to move through said conduit.

11. In a boring machine comprising a cutter, a motor, means driven by said motor to actuate said cutter, and means for supporting an article having an opening which is to be enlarged with said opening in line with said cutter, a suction apparatus comprising a movably mounted conduit having its intake end offset from the axis thereof and movable into sealing engagement with said article about the opening therein.

12. In a boring machine comprising a cutter, a motor, means driven by said motor to actuate said cutter, and means for supporting an article having an opening which is to be enlarged with said opening in line with said cutter, a suction apparatus comprising a conduit mounted for both pivotal movement and sliding movement and having its intake end arranged for movement into sealing engagement with said article about the opening therein.

13. In a boring machine comprising a cutter, a motor, means driven by said motor to actuate said cutter, and means for supporting an article having an opening which is to be enlarged with said opening in line with said cutter, a suction apparatus comprising a suction chamber connected at one end with a suction fan, a rigid conduit pivotally and slidably mounted in the other end of said chamber and having its intake end arranged to be moved into and out of a position in line with the opening in said article and in sealing engagement with said article.

14. In a boring machine comprising a cutter, a motor, means driven by said motor to actuate said cutter, and means for supporting an article having an opening which is to be enlarged with said opening in line with said cutter, a suction apparatus comprising a suction chamber connected at one end with a suction fan, a rigid conduit pivotally and slidably mounted in the other end of said chamber and having its intake end arranged to be moved into and out of a position in line with the opening in said article and into sealing engagement with said article, and a baffle arranged in said chamber between said conduit and said suction fan.

15. In a boring machine comprising a cutter, means to operate said cutter, and means for supporting the article to be bored in line with said cutter, a suction device comprising a conduit movable into and out of sealing engagement with said article about the opening therein to cause air to circulate about said cutter to cool the same and to withdraw chips therefrom.

16. In a boring machine, a tool, mechanism for rotating said tool and for feeding the same through the work which is to be bored, manually operable means for controlling said mechanism to initiate both the rotating movement and the feeding movement of said tool, means controlled in accordance with the feeding movement of said tool to automatically interrupt both the rotation and the feeding movement thereof and release the same for reverse movement when said tool has been advanced a predetermined distance, and means separate from said feeding mechanism to retract said tool after its rotation has been interrupted.

17. In a boring machine, a tool, a motor, means driven by said motor for rotating said tool, feeding means for moving said tool through the work which is to be bored, means including a clutch for operatively connecting said motor with said feeding means, means controlled by the feeding movement of said tool to stop said motor and disengage said clutch when said tool has been advanced a predetermined distance, and means for retracting said tool after said motor has been stopped and said clutch disengaged.

18. In a boring machine, a tool, means for feeding said tool through the work which is to be bored, a motor, means including a clutch for connecting said motor with said feeding means, other means driven by said motor for rotating said tool, manually operated means for starting said motor and setting said clutch, means controlled in accordance with the feeding movement of said tool to stop said motor and release said clutch when said tool has been advanced a predetermined distance, and means separate from said feeding means to retract said tool when said clutch has been released.

19. In a boring machine, a reciprocatory carriage, a shaft rotatably mounted in said carriage for reciprocatory movement therewith, a tool carried by said shaft, a motor, a driving connection between said motor and said carriage to impart feeding movement to the latter, a slidable connection between said motor and said shaft to rotate the tool, means controlled by the feeding movement of said carriage to stop said motor and to disconnect said carriage from said motor to release the carriage for reverse movement when the carriage has been advanced a predetermined distance, and other means acting on said carriage to retract the same when it has been so released.

20. In a boring machine, a reciprocatory carriage having a longitudinal toothed rack, a pinion meshing with said rack, a shaft rotatably mounted on said carriage for reciprocatory movement therewith, a tool carried by said shaft, a motor, a driving connection between said motor and said shaft to rotate said tool, means including a clutch to connect said motor with said pinion, means controlled in accordance with the movement of the carriage by said pinion to stop said motor and release said clutch, and means acting on said carriage independently of said rack and pinion to retract the carriage when said clutch has been released.

21. In a boring machine, a tool, electrically controlled means for rotating said tool and for imparting feeding movement thereto, manually operable switch means to initiate both movements of said tool, means controlled in accordance with the feeding movement of said tool to automatically operate said switch means to interrupt both movements of said tool when the tool has been advanced a predetermined distance, and other means for retracting said tool after its rotation has been interrupted.

22. In a boring machine, a tool, an electric motor, a driving connection between said motor and said tool to rotate the latter, means driven by said motor and including an electrically controlled clutch to impart feeding movement to said tool, switch means to control the operation of said motor and said clutch, said switch means being manually operable to initiate both movements of said tool, means controlled in accordance with the feeding movement of said tool to automatically operate said switch means to stop said motor and release said clutch when the tool has been advanced a predetermined distance, and means separate from said feeding means to retract said tool when said clutch has been released.

23. In a boring machine, a reciprocatory carriage, a shaft rotatably mounted in said carriage for reciprocatory movement therewith, a tool carried by said shaft, a motor, a driving connection between said motor and said carriage to impart feeding movement to the latter, a driving connection between said motor and said shaft to rotate said tool, manually controlled means to initiate both movements of said tool, means controlled in accordance with the feeding movements of said tool to automatically interrupt the rotation of said tool by said motor and the connection between said motor and said carriage when said tool has been advanced a predetermined distance, and separate means for retracting said tool when the connection between said motor and said carriage has been interrupted.

24. In a boring machine, a work support having operable means to retain the work thereon, a tool, mechanism for rotating said tool and feeding the same into engagement with the work on said work support, manually controlled means for initiating operation of the tool rotating and feeding mechanism, means controlled in accordance with the feeding movement of said tool to automatically stop the rotation and the feeding movement of said tool when the latter has been advanced a predetermined distance, means for automatically retracting said tool after it has ceased to rotate, and means controlled by the position of said tool to automatically cause said retaining means to release the work on said work support after said tool has been retracted.

25. In a boring machine, a reciprocatory carriage having a toothed rack extending lengthwise thereof, a rotatable tool carried by said carriage, means for actuating said carriage including a shaft and a pinion mounted on said shaft and meshing with said rack, means to support the work in line with said tool, electrically operated means for controlling the rotation of said tool and said shaft, said means comprising a switch which is manually operable to start the rotation of said tool and the movement of said carriage, means controlled by said shaft to open said switch when said carriage has been advanced a predetermined distance, and means acting on said carriage to retract the same when its forward movement has been interrupted and after the rotation of said cutter has been stopped.

26. In a boring machine, a reciprocatory carriage, a shaft rotatably mounted on said carriage for reciprocatory movement therewith, a tool carried by the forward end of said shaft, means for supporting the work in line with said tool, a motor driven element mounted in the rear of said carriage and slidably connected with the tool shaft to rotate said tool, motor driven means for imparting feeding movement to said carriage, electrically controlled means for disconnecting said carriage from said motor driven means, switch mechanism to control said electrically controlled means and said motor driven element, means controlled by the movement of said carriage to actuate said switch mechanism to stop the forward movement of said carriage and the rotation of said tool when said carriage has been advanced a predetermined distance, and means acting on said carriage to retract the same after it has been disconnected from said motor driven means and the rotation of said tool has been stopped.

27. In a boring machine, a frame having a guideway, a work support at one end of said guide-way, a reciprocatory carriage mounted on said guideway, a shaft rotatably mounted on said carriage for reciprocatory movement therewith, a tool carried by the forward end of said shaft, a motor mounted on said frame in the rear of said carriage and having a shaft slidably connected with the tool shaft to rotate said tool, means driven by said motor for imparting feeding movement to said carriage, electrically operated means including a switch to disconnect said carriage from said motor and interrupt the rotation of said tool by said motor, means controlled in accordance with the movement of said carriage for actuating said switch, and means acting on said carriage to retract the same after said switch has been actuated to stop the rotation of said tool and the feeding movement of said carriage.

28. In a boring machine, a reciprocatory carriage, a shaft rotatably mounted on said carriage for reciprocatory movement therewith, a tool carried by the forward end of said shaft, means for supporting the work in line with said tool, a motor mounted in the rear of said carriage, a flexible connecting member connected with the shaft of said motor and having a slidable connection with the tool shaft, means for imparting predetermined movement to said carriage, means including a clutch for connecting said feeding means with said motor, means controlled by the movement of the carriage to actuate said clutch to disconnect said carriage from said motor when said carriage has been advanced a predetermined distance and to interrupt the rotation of said tool by said motor, and means acting on said carriage to retract the same after it has been disconnected from said motor and the rotation of said tool has been stopped.

29. In a boring machine, a reciprocatory carriage, a cutter carried by said carriage, a shaft journaled in said carriage and connected with said cutter, means to support the work in line with said cutter, an electric motor connected with said shaft, actuating mechanism for said carriage, electrically controlled means for connecting said actuating mechanism with said motor, switch mechanism to control said motor and said connecting means, means controlled in accordance with the movement of said carriage to actuate said switch mechanism to cause said motor to be stopped and said carriage to be disconnected therefrom when said carriage has been advanced a predetermined distance, and means acting on said carriage to retract the same when its actuating mechanism has been disconnected from said motor and after said motor has been stopped.

30. In a boring machine, a reciprocatory carriage, a rotatable cutter carried by said carriage, means to support the work in line with said cutter, a motor to rotate said cutter, means including a shaft to actuate said carriage, an electrically controlled clutch for connecting said shaft with said motor, switch means to control the operation of said motor and said clutch, means controlled by said shaft to actuate said switch means when said carriage has been advanced a predetermined distance, and means connected with said carriage to retract the same when said carriage is released and after said motor has been stopped.

31. In a boring machine, a reciprocatory carriage, a rotatable cutter carried by said carriage, means to support the work in line with said cutter, a motor to rotate said cutter, means including a shaft for actuating said carriage, an electrically controlled clutch for connecting said shaft with said motor, a switch to control the operation of said motor and said clutch, a switch actuating device adjustably mounted on said shaft to open said switch when said carriage has been advanced a distance determined by the adjustment of said switch actuating device, and means connected with said carriage to retract the same when said clutch is released and after said motor has been stopped.

32. In a machine of the character described, a tool, feeding mechanism for said tool including means for starting the feeding operation, a device to control the operation of said starting means, a stationary work support having a part to be engaged by the work and to support the same in proper relation to said tool, said work support having means controlled by the work thereon to control the operation of the device which controls the starting means.

33. In a machine of the character described, a tool, feeding mechanism for said tool including means for starting the feeding operation, a device to control the operation of said starting means, a stationary work support having a part to be engaged by the work and to support the same in proper relation to said tool, and an operable device arranged to be engaged by the work on said work support to control the operation of the first mentioned device.

34. In a machine of the character described, a tool, feeding mechanism for said tool including a clutch, means for actuating said clutch, a stationary work support having a part to be engaged by the work and to support the same in proper relation to said tool, said work support having means controlled by the work thereon to control the operation of said clutch actuating means.

35. In a machine of the character described, a tool, feeding mechanism for said tool including a clutch, means for actuating said clutch, a stationary work support having a part to be engaged by the work and to support the same in proper relation to said tool, and a device arranged to be actuated by the work when the latter is properly positioned on said work support to cause said means to actuate said clutch.

36. In a machine of the character described, a tool, feeding mechanism for said tool including a clutch, means for actuating said clutch, a device to control the operation of said clutch actuating means, a stationary work support having a part to be engaged by the work and to support the same in proper relation to said tool, said work support having means controlled by the work thereon to prevent the operation of said device until the work is properly positioned on said work support.

37. In a machine of the character described, a tool, feeding mechanism for said tool including a clutch, means for actuating said clutch, a device to control the operation of said clutch actuating means, a stationary work support having a part to be engaged by the work and to support the same in proper relation to the tool, and an operable device mounted on said work support and arranged to be actuated by the work thereon to control the operation of the first mentioned device.

38. In a machine of the character described, a tool, feeding mechanism for said tool, electrically operated means to control the operation of said feeding mechanism, a stationary work support having a part to be engaged by the work and to support the same in proper relation to the tool, and means controlled by the work on said work support to control the operation of said electrically operated means.

39. In a machine of the character described, a tool, feeding mechanism for said tool, electrically operated means to control the operation of said feeding mechanism, a switch to control the operation of said electrically operated means, a stationary work support having a part to be engaged by the work and to support the same in proper relation to the tool, and an actuating device for said switch mounted on said work support and arranged to be controlled by the work on said work support.

40. In a boring machine, a reciprocatory carriage, a tool carried by said carriage, a shaft journaled on said carriage and connected with said tool, power operated means to rotate said shaft and actuate said carriage, a work support having a part to be engaged by the work and to support the same in proper relation to the tool, and work controlled means associated with said part of said work support to prevent the operation of said shaft and said carriage by said power operated means until the work is properly positioned on said work support.

41. In a boring machine, a tool, a work support having a part to be engaged by the work and to support the same in proper relation to the tool, feeding mechanism to move said tool into engagement with the work on said work support, and means for initiating the operation of said feeding mechanism including a controlling part movably mounted on said work support and arranged to be engaged and actuated by the work when the latter is placed in position on said part of said work support.

42. In a boring machine comprising a tool, a motor, means driven by said motor for actuating said tool, and a work support having a part to be engaged by the work and to support the same in proper relation to the tool, means for controlling the operation of said motor including a switch mounted on said work support and arranged to be actuated by the work only when the latter is properly positioned on said part of said work support.

43. In a boring machine comprising a tool, a motor, means driven by said motor for actuating said tool, and a work support having a part to be engaged by the work and to support the same in proper relation to the tool, means for controlling the operation of said motor including a normally open switch having a part slidably mounted on said work support and projecting beyond the same in a position to be actuated by the work only when the latter is placed in proper position on said part of said work support.

44. In a boring machine, a tool, a work support having a part to be engaged by the work and to support the same in proper relation to the tool, feeding mechanism to move said tool into engagement with the work on said work support, electrically operated means including normally open switch for initiating the operation of said feeding mechanism, and means for closing said switch including a part slidably mounted in said work support and projecting beyond the same into a position to be engaged and actuated by the work when the latter is placed in position on said part of said work support.

45. In a boring machine comprising a tool, a motor, means driven by said motor for imparting feeding movement to said tool, and a work support having a part to be engaged by the work and to support the same in proper relation to the tool, means for controlling the operation of said tool by said motor including a plurality of switches connected in series and each having a movable part mounted on said work support and projecting beyond the same, said parts of said switches being so arranged with relation to said part of said work support that they may both be engaged and actuated by the work only when the latter is in its proper position on said work support.

46. In a boring machine, a reciprocatory carriage, a tool carried by said carriage, a shaft journaled on said carriage and connected with said tool, an electric motor having driving connection with said shaft, actuating mechanism for said carriage connected with said motor and including a clutch, a work support comprising a magnetic chuck, means controlled in accordance with the movement of said carriage and arranged to operate when a predetermined movement has been imparted to said tool to interrupt the operation of said motor, to release said clutch and to deenergize said chuck, and means for retracting said carriage.

47. In a boring machine, a reciprocatory carriage, a tool carried by said carriage, a shaft journaled in said carriage and connected with said tool, power operated means for actuating said tool and said carriage, a work support having operable means to retain the work thereon, means controlled in accordance with the movement of said carriage to interrupt the forward movement of said carriage when said tool has been advanced a predetermined distance, means to retract said carriage, and means controlled in accordance with the movement of said carriage to prevent said operable means from releasing the work until said tool has been fully withdrawn from the work.

48. In a boring machine, a reciprocatory carriage, a tool carried by said carriage, a shaft journaled in said carriage and connected with said tool, power operated means for actuating said tool and said carriage, a work support comprising a magnetic chuck, a switch to control the energization of said chuck, means controlled in accordance with the movement of said carriage to interrupt the forward movement thereof when said tool has been advanced a predetermined distance and to thereafter cause said switch to be opened, and means to retract said carriage and withdraw the tool from the work before said switch is opened.

49. In a boring machine, a reciprocatory carriage, a tool carried by said carriage, a shaft journaled in said carriage and connected with said tool, power operated means for actuating said tool and said carriage, a work support comprising a magnetic chuck, a manually operated switch to energize said chuck, means controlled in accordance with the movement of said carriage to interrupt the forward movement of said carriage and open said switch when said tool has been advanced a predetermined distance, means to retract said carriage, a second switch connected with said chuck in parallel with the first mentioned switch, and actuating means for said second switch controlled in accordance with the movement of said carriage and arranged to cause said second switch to remain closed during the initial reverse movement of said carriage and to be opened when said carriage has been retracted a predetermined distance.

GEORGE H. LELAND.